No. 870,816. PATENTED NOV. 12, 1907.
W. COOPER.
VEHICLE MOTOR CONTROL SYSTEM.
APPLICATION FILED JAN. 3, 1906.
2 SHEETS—SHEET 2.
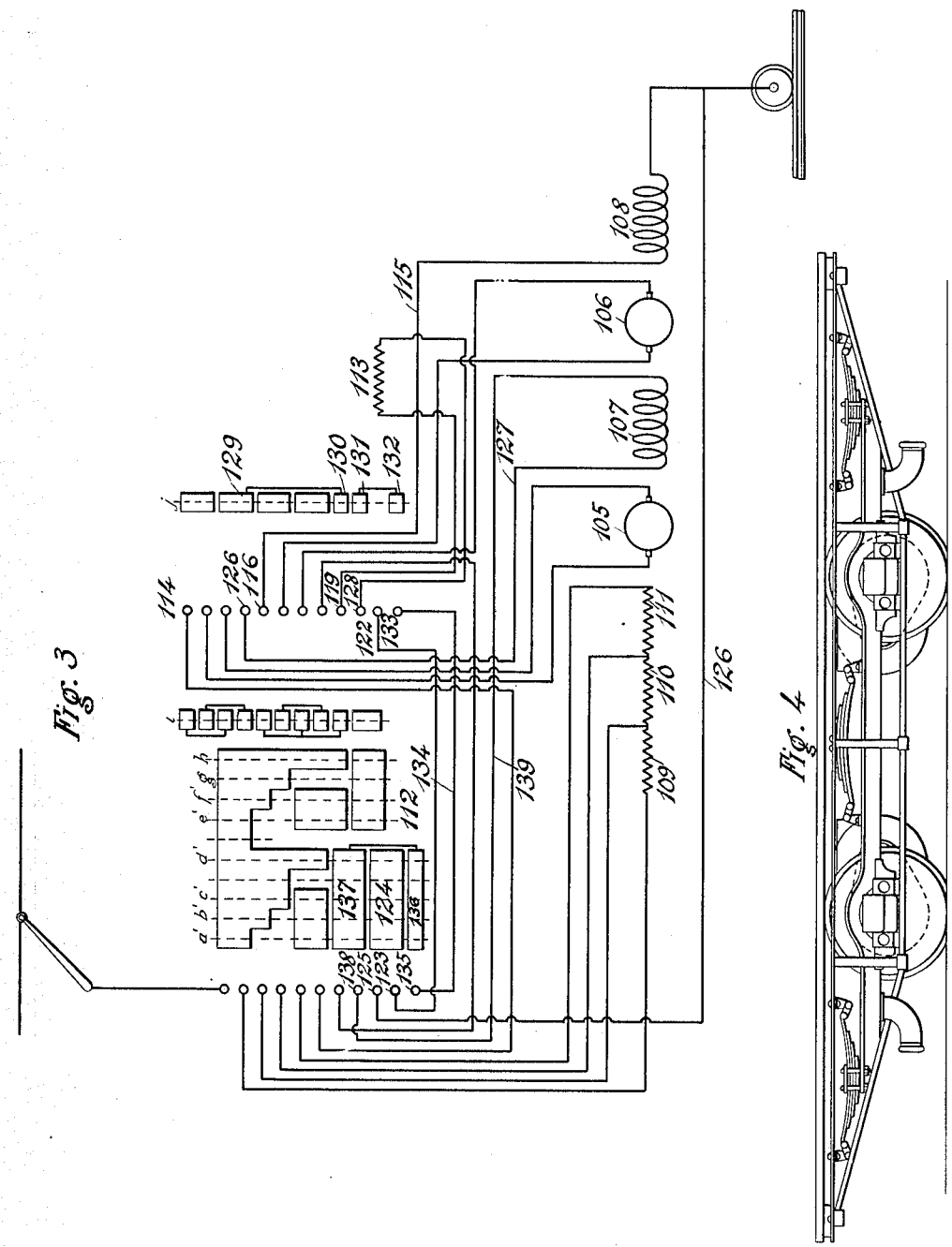
WITNESSES:
Camille Boulin
R. P. Dearborn.
INVENTOR
William Cooper
BY
Wesley G. Carr
ATTORNEY

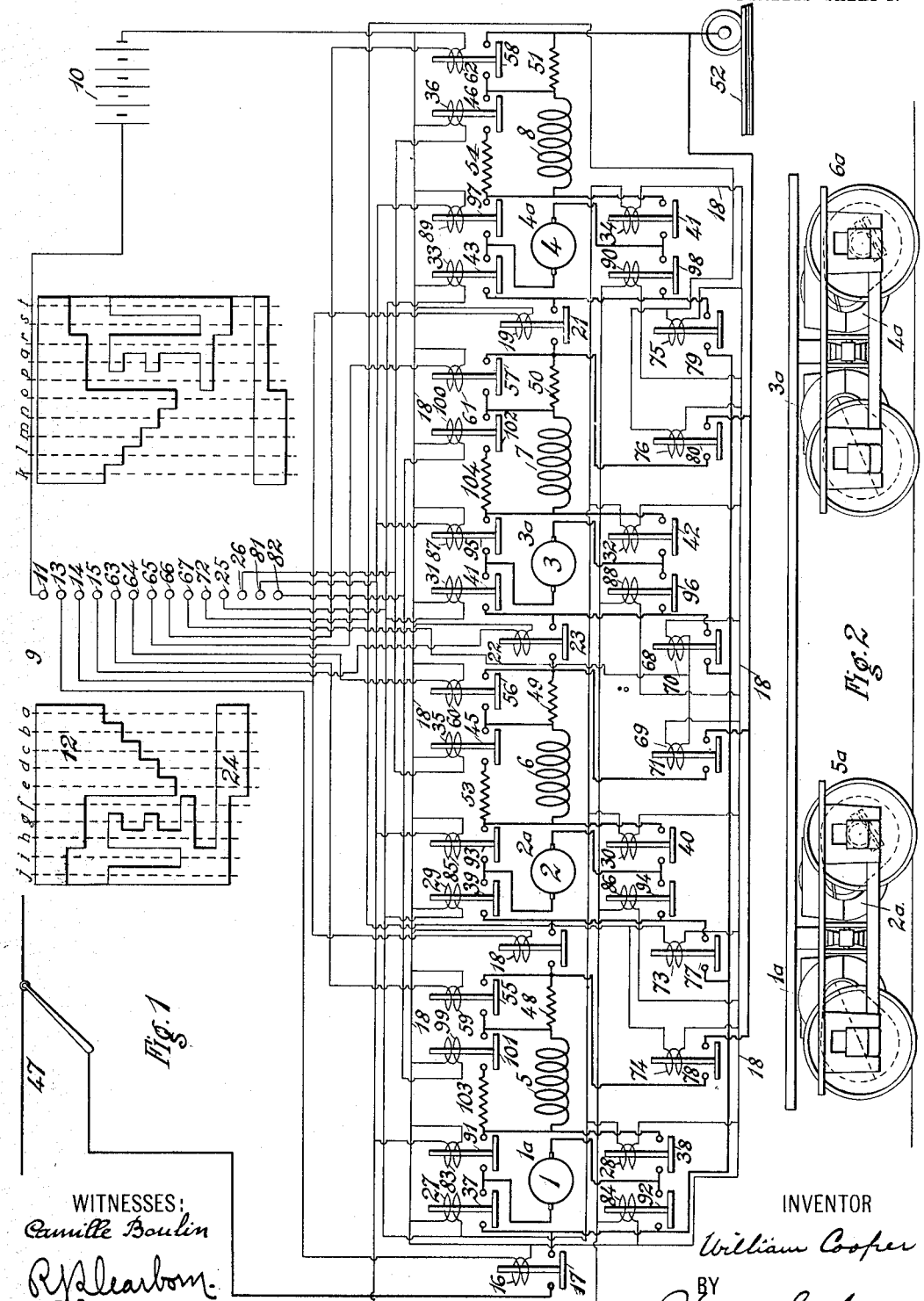

UNITED STATES PATENT OFFICE.

WILLIAM COOPER, OF WILKINSBURG, PENNSYLVANIA, ASSIGNOR TO WESTINGHOUSE ELECTRIC & MANUFACTURING COMPANY, A CORPORATION OF PENNSYLVANIA.

VEHICLE-MOTOR-CONTROL SYSTEM.

No. 870,816.                Specification of Letters Patent.           Patented Nov. 12, 1907.

Application filed January 3, 1906. Serial No. 294,422.

*To all whom it may concern:*

Be it known that I, WILLIAM COOPER, a citizen of the United States, and a resident of Wilkinsburg, in the county of Allegheny and State of Pennsylvania, have invented a new and useful Improvement in Vehicle-Motor-Control Systems, of which the following is a specification.

My invention relates to vehicles, and has special reference to the starting of such vehicles as are electrically propelled and are adapted for railway service.

The object of my invention is to provide means for so regulating the torque applied to the several pairs of vehicle wheels that a maximum accelerating force is insured.

In the design and construction of vehicles which are propelled by motors or similar driving means carried upon the vehicle itself, the entire weight of the vehicle and its equipment is, so far as possible, equally distributed upon the several pairs of driving wheels. This is substantially true of vehicles which are driven by electric motors and, when starting such vehicles, it has been customary in the prior art to connect the motors, which were usually of the series type and of similar design, in series circuit relation so that equal torques were exerted by the several motors. This is evident from the fact that the torque exerted by an electric motor is dependent upon and proportional to, the armature current, the magnetic lines produced by the field magnet winding and the number of armature convolutions; these factors being equal in the several motors on account of the similarity of design and the series circuit relations existing between them.

When electric vehicles constructed along the lines indicated above are started under adverse or heavy conditions of service, such as are constantly imposed upon motor-driven locomotives, the forward wheels on each truck are observed to slip before the rear wheels of the same truck, which proves that at the moment of starting, the weight of a vehicle is unequally distributed between the forward and rear wheels of each truck although such weight may be equally divided when the vehicle is at rest. This action may be explained as due to the reaction of the rails upon the wheels when a rotary motion is imparted to the latter.

The draw-bar pull of a locomotive or the accelerating force of a vehicle similarly propelled, is therefore proportional to a multiple (depending upon the number of motors) of the maximum value of torque which may be applied to the forward wheels of any one truck without slipping, since the torques exerted by the several motors are equal, and this value is substantially less than it may become if the torque of each motor is automatically varied, with respect to that of the others, to suit the specific conditions imposed upon it at starting.

With a view to increasing to a maximum the draw-bar pull which may be exerted by a locomotive of a given weight, I have provided means for automatically reducing the relative torques exerted by the forward motors of each truck and since the possibility of slipping exists only during the starting period, I automatically reëstablish the equality between the torques exerted by the several motors when their circuit connections are changed to a multiple relation. This object may be most conveniently and economically accomplished by varying the field magnetization on the forward motors of each truck since the other factors upon which the torque depends do not lend themselves readily to automatic adjustment. To effect this variation I provide a shunt circuit for the field magnet winding of each motor which includes a suitable resistance and a circuit interrupting device. The shunt circuits for the forward motors of each equipment are closed when the vehicle is started, their selection being dependent upon the reversing switch of the motor control system which determines the direction in which the motors are started. In this way the operator who determines the direction of travel, simultaneously shunts the field windings of the forward motors for that direction on each truck which reduces the field excitation of the motors affected and consequently the torque which they exert and thereby makes it possible for a larger current to be applied to all the motors without causing any of the wheels to slip.

I have found by practical tests that in some instances the torque exerted by the rear motors may be from 40 to 50 percent. greater than that exerted by the forward motors on a given truck before slipping occurs, so that, in a four motor equipment, the draw-bar pull may be increased from 20 to 25 percent.

Figure 1 of the accompanying drawings is a diagrammatic view of the circuit connections for a group of four electric motors which embody my invention and which are, for simplicity and convenience, controlled by a system comprising a plurality of independent electrically-operated switches all of which govern the motor circuits directly and are controlled by a master switch. Fig. 2 is an elevation of a double truck vehicle running gear which shows the location of the motors of Fig. 1 on the trucks, Fig. 3 is a diagrammatic view of the circuit connections for a group of two electric motors that are controlled directly by a drum type of controller, the cylindrical drums of which are shown as developed into a single plane and Fig. 4 is an elevation of a single truck vehicle running gear which shows the location of the motors of Fig. 3. The system of Fig. 3 is also arranged in accordance with my invention but in this case a single resistance is used for shunting both of the motor field magnet windings by transferring it from one to the other according to the direction of rotation of the motors.

Although illustrated as indicated above, my invention is not restricted to any specific system of control and is obviously capable of general application to vehicle equipments.

The motor group illustrated in Figs. 1 and 2 and its system of control comprise in general a plurality of electric motors 1ª, 2ª, 3ª and 4ª of the series type which are provided with armatures 1, 2, 3 and 4 and field magnet windings 5, 6, 7 and 8, the motors 1ª and 2ª being located on a truck 5ª while motors 3ª and 4ª are located on a truck 6ª. The circuit arrangement of these motors is dependent upon a master switch or controller 9 which is adapted to occupy any one of a plurality of positions $a$, $b$, $c$, $d$, $e$, $f$, $g$, $h$, $i$, $j$, $k$, $l$, $m$, $n$, $o$, $p$, $q$, $r$, $s$ and $t$ and which controls directly a plurality of electrically operated switches. When the controller 9 occupies the position $a$ energy is supplied from the positive terminal of a battery 10 through contact finger 11, and contact ring segment 12 to contact fingers 13, 14 and 15. From contact finger 13 energy is supplied to a magnetizing coil 16 of a line switch 17 from which point circuit is completed through a conductor 18 to the negative terminal of the battery 10; from finger 14 energy is supplied to magnet windings 18 and 19 of switches 20 and 21, the remaining terminals of which are also connected to the conductor 18, and from the finger 15 energy is supplied to magnet coil 22 of the switch 23. The ring segment 12 is electrically connected with a ring segment 24, which, in this position, is engaged by contact fingers 25 and 26, so that energy is also supplied to magnet coils 27, 28, 29, 30, 31, 32, 33 and 34 from finger 25 and magnet coils 35 and 36 from contact finger 26; the return circuit from all of these coils being completed through the conductor 18. The magnet coils 27 to 36 inclusive are actuating coils for switches 37 to 46 inclusive. When these switches have been closed by reason of the energizing of their magnet coils, energy is supplied from a line conductor 47 through switches 17 and 37, armature 1, switch 38, field magnet winding 5, resistance 48, switches 20 and 39, armature 2, switch 40, field magnet winding 6, resistance 49, switches 23 and 41, armature 3, switch 42, field magnet winding 7, resistance 50, switches 21 and 43, armature 4, switch 44, field magnet winding 8 and resistance 51 to an opposite line conductor 52. Shunt circuits are completed around field magnet windings 6 and 8, respectively, through resistance 53 and switch 45, and resistance 54 and switch 46.

It will be observed that the four motors are now connected in series relation with resistance portions 48, 49, 50 and 51 included in the circuit, while a circuit is provided in parallel with the field magnet windings 6 and 8 of the motors 2ª and 4ª. These multiple circuits carry a portion of the current, all of which would otherwise pass through the field magnet winding.

As the controller 9 occupies positions $b$, $c$, $d$ and $e$, consecutively, fingers 63, 64, 65 and 66 successively engage ring segment 12, the circuit connections for the motors remaining the same except for the resistance portions 48, 49, 50 and 51, which are successively short-circuited by the switches 55, 56, 57 and 58, movement of which is effected by their respective magnet coils 59, 60, 61 and 62. If the vehicle to which the four motors may be applied fails to start when the controller has passed through positions $a$, $b$, $c$ and $d$, and occupies the position $e$, it may be assumed that the motors are inadequate for the service imposed. The current in the field magnet windings 6 and 8 of the motors 2ª and 4ª, which are the forward motors on the trucks 5ª and 6ª, is reduced through these possible starting positions so that the torque exerted by these motors is also reduced. The contact finger 26 becomes disengaged from the ring segment 24 as the controller 9 moves from the position $e$ to the position $f$, since the possibility of the vehicle wheels slipping is removed after the motors are started. The contact fingers 15, 63, 64, 65 and 66 are then disengaged from the ring segment 12 and finger 67 is moved into engagement with the ring segment 24. In this way, energy is no longer supplied to the magnet coils 35, 36, 22, 59, 60, 61 and 62 so that switches 45, 46, 23, 55, 56, 57 and 58 are opened and switches 68 and 69 are closed by reason of the completion of the battery circuit through magnet coils 70 and 71, which are supplied with energy from contact finger 67 and are connected to the negative conductor 18. Circuit is now completed from the supply conductor 47 through the line switch 17, switches 37, armature 1, switch 38, field magnet winding 5, resistance 48, switches 20 and 39, armature 2, switch 40, field magnet winding 6, resistance 49 and switch 69 to the opposite line conductor 52, and also through the line switch 17, switches 68 and 41, armature 3, switch 42, field magnet winding 7, resistance 50, switches 21 and 43, armature 4, switch 41, field magnet winding 8 and resistance 51 to the line conductor. Thus motors 1ª and 2ª are connected across the line in series relation with suitable resistance in circuit and the motors 3ª and 4ª are similarly connected in multiple relation with the first two. As the controller occupies positions $g$ and $h$, resistance portions 48 and 50, and resistance portions 49 and 51 are, respectively, short-circuited by the reclosure of the switches 55 and 57, and 56 and 58, respectively, which is effected by the reëngagement of fingers 63 and 65 with ring segment 24 in position $g$ and the similar engagement of fingers 64 and 66 in position $h$. The resistance-short-circuiting switches are again opened as the controller moves to position $i$ and finger 14 becomes disengaged from the ring segment 12 so that the magnet coils 18 and 19 are deënergized and switches 20 and 21 are opened. Contact finger 72 moves into engagement with contact ring segment 24 and energy is supplied therethrough to the magnet coils 73, 74, 75 and 76 of the switches 77, 78, 79 and 80 which are consequently closed. Ci cuit is now completed from line conductor 47 through line switch 17, switch 37, armature 1, switch 38, field magnet winding 5, resistance 48 and switch 78 to the line conductor 52; from the line switch 17 through switches 77 and 39, armature 2, switch 40, field magnet winding 6, resistance 49 and switch 69 to the line conductor; through switches 68 and 41, armature 3, switch 42, field magnet winding 7, resistance 50 and switch 80 to the conductor 52 and through switches 79 and 43, armature 4, switch 41, field magnet winding 8, resistance 51 to conductor 52.

When the controller finally occupies position $j$, electromagnets 59, 60, 61 and 62 are energized and the switches 55, 56, 57 and 58 are closed so that resistance portions 48, 49, 50 and 51 are short-circuited, leaving the four motors connected in multiple relation across the line according to the usual practice. The direction of rotation of all the motors may be reversed by rotating the controller to the "off" position and moving it consecutively through positions $k$ to $t$ inclusive, in which positions the engagement of the fingers 11, 13, 14, 15, 16, 63, 64, 65, 66, 67 and 72 are the same as already described for the positions $a, b, c, d, e, f, g, h, i$ and $j$. Energy is not supplied, however in these positions to fingers 25 and 26 but energy is correspondingly supplied to contact fingers 81 and 82. From the finger 81 energy is supplied to magnet coils 83, 84, 85, 86, 87, 88, 89 and 90 of the switches 91, 92, 93, 94, 95, 96, 97 and 98 which are consequently closed and serve to reverse the direction of current flowing through the armatures 1, 2, 3 and 4 while the controller 9 occupies the positions $k$ to $t$ inclusive. Energy is supplied from the finger 82 during the positions $k, l, m, n$ and $o$ to electromagnets 99 and 100 of switches 101 and 102, which are closed during these positions to form shunt circuits comprising a resistance portion 103 and switch 101, a resistance 104 and a switch 102, respectively. In this way the current passing through the field magnet windings 5 and 7 of the motors $1^a$ and $3^a$ is decreased during the positions $k, l, m, n$ and $o$, which is the starting position for this direction of rotation, and thereby the torque is reduced during the starting period in these two motors which are now the forward motors on the trucks $5^a$ and $6^a$.

In the system of Fig. 3 which comprises two motors that are provided with armatures 105 and 106, field magnet windings 107 and 108 and a plurality of resistance sections 109, 110 and 111, the circuit arrangement of the motors and resistance sections is determined by a controller, the control drum 112 of which is adapted to occupy a plurality of positions $a', b', c', d', e', f', g'$ and $h'$ and the reverse drum 114 of which is adapted to occupy positions $i'$ and $j'$. Field magnet windings 107 and 108 may be shunted by a resistance 113 which is connected in multiple circuit with one field magnet winding when the reverse drum occupies position $j'$ and with the other field magnet winding when the reversing drum occupies the position $i'$. In either case the circuit through the resistance 113 is completed through a contact ring on the control drum 112 so that the shunt circuits are opened after the controller has traversed the starting positions $a', b', c'$ and $d'$. As the drum 112 occupies successive positions $a', b', c'$ and $d'$ the resistance portions 109, 110 and 111 are short-circuited in a well known manner, the direction of rotation of the motor being determined by the reverse drum 114. Since the action of controllers of this characters is no part of my present invention I deem it unnecessary to describe the circuit arrangements for the several controller positions in detail.

When the drum 112 occupies position $a$ and the reversing drum 114 occupies position $i'$ a shunt circuit is completed from one terminal of the field magnet winding 108 through conductor 115, contact finger 116, ring segments 117 and 118, contact finger 119, resistance 113, contact finger 128, ring segment 121, contact fingers 122 and 123, ring segment 124, contact finger 125 and conductor 126 to the opposite terminal of the field magnet winding. This resistance shunt circuit is maintained as long as the contact fingers 123 and 125 are in engagement with ring segment 124; namely, starting positions $a', b', c'$ and $d'$.

If the reversing switch 114 occupies position $j'$ a shunt circuit is completed from one terminal of the field magnet winding 107 to conductor 127, contact finger 140, ring segments 129 and 130, contact finger 119, resistance 113, contact finger 128, ring segments 131 and 132, contact finger 133, conductor 134, contact finger 135, ring segments 136 and 137, contact finger 138 and conductor 139 to the opposite terminal of the field magnet winding. The contact finger 135 is similarly disengaged from the ring segment 136 after the controlling drum has traversed the starting positions $a', b', c'$ and $d'$. In this way, although the resistance 113 is used in both instances, the field magnet winding of the forward motor is shunted for each direction of travel, so that the torque of this motor is relatively reduced and the drawbar pull or accelerating force of the vehicle is consequently increased, as hereinbefore explained.

When two governing switches such as controller 112, Fig. 3, are used, one on each end of a vehicle, the circuit connections for both are similar to those shown in the figure but care should be taken to effect the connection of the resistance 113 in parallel with the field magnet winding of the forward motor for each direction of motion whether the motors are governed from the one or the other of the switches.

I claim as my invention:

1. In a vehicle, the combination with one or more trucks and means for driving the truck wheels in pairs, of means for decreasing the torque exerted upon the leading pair of wheels of each truck during starting.

2. In an electric vehicle, the combination with one or more carrying trucks and electric motors for driving the respective pairs of truck wheels, of means for relatively reducing the torque exerted by the forward motor on each truck during starting.

3. In an electric vehicle, the combination with one or more carrying trucks and an electric motor for driving each pair of truck wheels, of means for automatically reducing the relative torque exerted by the forward motor on each truck during starting.

4. The combination with a plurality of electric vehicle motors, field magnet windings therefor, of means for relatively and automatically reducing the magnetization produced by said field magnet windings in the forward motor of each truck.

5. The combination with an electric vehicle, two trucks therefor, four similar motors equally disposed on said trucks, of means for relatively reducing the torque of the forward motor on each truck while the motors are connected in series relation.

6. The combination with an electric vehicle, two trucks therefor, four similar motors equally disposed on said trucks, of means for relatively and automatically reducing the torque of the forward motor on each truck while the motors are connected in series relation.

7. The combination with a plurality of electric driving motors equally disposed upon vehicle trucks and controlling means for said motors, of means for relatively and automatically decreasing the field magnetization of the forward motor on each truck.

8. The combination with a plurality of electric driving motors equally disposed upon vehicle trucks and controlling means for said motors, of means for relatively and automatically decreasing the field magnetization of the forward motor on each truck while the motors are connected in series relation.

9. The combination with four electric driving motors equally disposed on two vehicle trucks and controlling means for said motors, of means for automatically completing a resistance circuit in parallel with the field magnet winding of the forward motor on each truck.

10. In an electric vehicle, the combination with one or more trucks and an electric driving motor for each pair of wheels, of means for relatively and automatically reducing the torque of the forward motor on each truck during the starting period that is dependent upon a reduction of the magnetizing current in the field magnet circuits of said forward motors.

11. In an electric vehicle, the combination with a plurality of electric motors, field magnet windings therefor and controlling means which determine the motor circuit relations, of means for relatively reducing the torque exerted by the forward motor on each vehicle truck during the starting period.

12. In an electric vehicle, the combination with a plurality of electric motors, field magnet windings therefor and controlling means which determine the motor circuit relations, of means for relatively reducing the current flowing through the field magnet windings of the forward motor on each truck during the starting period.

13. In an electric vehicle, the combination with a plurality of electric motors, field magnet windings therefor and controlling means which determine the motor circuit relations, of a plurality of resistance shunt circuits for the several field magnet windings in which interrupting devices are located and means for closing the shunt circuit for the forward motor on each vehicle truck.

14. The combination with a vehicle truck, a pair of driving motors located thereon, field magnet windings therefor and means for determining the direction of the motion imparted to the truck, of means for automatically transferring a shunt resistance from the field magnet winding of one motor to the field magnet winding of the other motor when the direction of truck motion is reversed.

15. In an electric vehicle, the combination with one or more trucks, a plurality of electric motors equally distributed thereon, field magnet windings for the several motors and means for controlling the motor circuit arrangement that comprises a plurality of independent, electrically-operated switches, of means for relatively reducing the torque on the forward motor on each vehicle truck during the starting period.

16. In an electric vehicle, the combination with one or more trucks, a plurality of electric motors equally distributed thereon, field magnet windings for the several motors and means for controlling the motor circuit arrangement that comprises a plurality of independent, electrically-operated switches, of means for relatively reducing the current flowing through the field magnet windings of the forward motor on each truck during the starting period.

17. In an electric vehicle, the combination with one or more trucks, a plurality of electric motors equally distributed thereon, field magnet windings for the several motors and means for controlling the motor circuit arrangement that comprises a plurality of independent, electrically-operated switches, of a plurality of resistance shunt circuits for the several field magnet windings in which interrupting devices are located and means for closing the shunt circuit of the forward motor on each truck.

In testimony whereof, I have hereunto subscribed my name this 30th day of December, 1905.

WILLIAM COOPER.

Witnesses:
R. J. DEARBORN,
BIRNEY HINES.